US010561182B2

United States Patent
Ryan et al.

(10) Patent No.: US 10,561,182 B2
(45) Date of Patent: *Feb. 18, 2020

(54) MOISTURE WICKING AND COOLING CAPSULES HAVING AN OUTER SHELL COMPRISING A SILOXANE AND METHODS FOR MAKING SAME

(71) Applicant: MICROTEK LABORATORIES, INC., Dayton, OH (US)

(72) Inventors: Kayla L. M. Ryan, Alamogordo, NM (US); Carl M. Lentz, Waynesville, OH (US)

(73) Assignee: Microtek Laboratories, INC., Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/906,015

(22) Filed: Feb. 27, 2018

(65) Prior Publication Data

US 2018/0242665 A1    Aug. 30, 2018

Related U.S. Application Data

(60) Provisional application No. 62/464,733, filed on Feb. 28, 2017.

(51) Int. Cl.
*A41D 31/02* (2019.01)
*B01J 20/26* (2006.01)
*B01J 20/28* (2006.01)
(Continued)

(52) U.S. Cl.
CPC ............ *A41D 31/02* (2013.01); *A41D 27/02* (2013.01); *A42B 3/125* (2013.01); *B01J 20/265* (2013.01);
(Continued)

(58) Field of Classification Search
CPC .............. B01J 20/265; B01J 20/28004; B01J 20/28019; B01J 20/3208; B01J 20/3217;
(Continued)

(56) References Cited

U.S. PATENT DOCUMENTS 5,211,949 A    5/1993    Salyer
5,353,524 A    10/1994    Brier
(Continued)

FOREIGN PATENT DOCUMENTS

| CN | 202045924 U | 11/2011 |
| WO | 200248038 A2 | 6/2002 |

(Continued)

OTHER PUBLICATIONS

Zhang et al., Silica encapsulation of n-octadecane via sol-gel process: A novel microencapsulated phase-change material with enhanced thermal conductivity and performance, Journal of Colloid and Interface Science, Mar. 1, 2010, pp. 246-255, vol. 343—issue 1, Elsevier.

(Continued)

*Primary Examiner* — Vincent Tatesure
(74) *Attorney, Agent, or Firm* — FisherBroyles, LLP; Susan M. Oiler

(57) ABSTRACT

Microcapsules or macrocapsules have a core composition that includes a phase changing material (PCM) encapsulated within a polymer wall with an outer shell having a siloxane tethered to an exterior surface of the polymer wall by a surfactant. The siloxane may form a crystalline or a sol-gel outer shell. Methods of making such capsules and textile fabrics and clothing incorporating such capsules include treating pre-formed capsules with a surfactant solution followed by treating with a compound containing a siloxane functional group. The surfactant connects or tethers the (Continued)

siloxane to the exterior surface of the polymer wall and the siloxane forms an outer shell of the capsules.

20 Claims, 9 Drawing Sheets

(51) Int. Cl.
   *B01J 20/32* (2006.01)
   *A41D 27/02* (2006.01)
   *A42B 3/12* (2006.01)
   *C09K 5/06* (2006.01)
   *A42B 3/06* (2006.01)
   *A63B 21/00* (2006.01)

(52) U.S. Cl.
   CPC ... *B01J 20/28004* (2013.01); *B01J 20/28019* (2013.01); *B01J 20/3208* (2013.01); *B01J 20/3217* (2013.01); *B01J 20/3246* (2013.01); *B01J 20/3293* (2013.01); *C09K 5/066* (2013.01); *A41D 2600/10* (2013.01); *A42B 3/066* (2013.01); *A63B 21/4037* (2015.10)

(58) Field of Classification Search
   CPC ... B01J 20/3246; B01J 20/3293; A41D 31/02; A41D 27/02; A42B 3/125; C09K 5/066
   USPC .......................................................... 442/59
   See application file for complete search history.

(56) References Cited

U.S. PATENT DOCUMENTS

| | | | |
|---|---|---|---|
| 5,435,014 | A | 7/1995 | Moretz et al. |
| 5,441,436 | A | 8/1995 | Moretz et al. |
| 6,099,894 | A | 8/2000 | Holman |
| 7,012,033 | B2 | 3/2006 | Hayes et al. |
| 10,221,323 | B2 * | 3/2019 | Lentz ............... A01N 25/28 |
| 2010/0087115 | A1 | 4/2010 | Davis et al. |
| 2015/0158003 | A1 | 6/2015 | Virgallito et al. |
| 2015/0190774 | A1 | 7/2015 | Phipps et al. |

FOREIGN PATENT DOCUMENTS

| | | |
|---|---|---|
| WO | 2016007830 A3 | 1/2016 |
| WO | 2016124784 A1 | 8/2016 |
| WO | 2017031321 A1 | 2/2017 |

OTHER PUBLICATIONS

Zhang et al., Fabrication of microencapsulated phase change materials based on n-octadecane core and silica shell through interfacial polycondensation, Colloids and Surfaces A: Physicochemical and Engineering Aspects, Sep. 20, 2011, pp. 104-117, vol. 389—issue 1-3, Elsevier.

Chen et al., Synthesis and Characterization of Microencapsulated Paraffin Microcapsules as Shape-Stabilized Thermal Energy Storage Materials, Nanoscale and Microscale Thermophysical Engineering, Apr. 20, 2013, pp. 112-123, vol. 17—issue 2, Taylor & Francis Group.

Latibari et al., Synthesis, characterization and thermal properties of nanoencapsulated phase change materials via sol-gel method, Energy, Nov. 1, 2013, pp. 664-672, vol. 61, Elsevier.

Ashraf et al., Effectiveness of silica based sol-gel microencapsulation method for odorants and flavors leading to sustainable environment, Frontiers in Chemistry, Aug. 11, 2015, vol. 3, Frontiers Media SA.

Holme, Innovative technologies for high performance textiles, Coloration Technology, Mar. 20, 2007, pp. 59-73, vol. 123—issue 2, Wiley.

Fang He et al., New approach for sol-gel synthesis of microencapsulated n-octadecane phase change material with silica wall using sodium silicate precursor, Energy, Apr. 1, 2014, pp. 223-233, vol. 67, Elsevier.

Wenbo Liao et al., Preparation of Organic/Inorganic Hybrid Polymer Emulsions with High Silicon Content and Sol-gel-derived Thin Films, Chinese Journal of Chemical Engineering, Feb. 2010, pp. 156-163, vol. 18—issue 1, Elsevier.

Abdallah et al., Does wearing clothing made of a synthetic cooling fabric improving indoor cycle exercising endurance in trained athletes?, Physiological Reports, Aug. 19, 2015, vol. 3—issue 8, Wiley-Blackwell.

Onder et al., Encapsulation of phase change materials by complex coacervation to improve thermal performances of woven fabrics, Thermochimica Acta, Jan. 30, 2008, pp. 63-72, vol. 467—issues 1-2, Elsevier.

WO, International Search Report and the Written Opinion; PCT/US18/19847, dated May 8, 2018.

Nassau et al., A Study of the General Electric Synthetic Jadeite, Gems & Gemology, Spring 1987, p. 27-35.

* cited by examiner

MOISTURE WICKING AND COOLING CAPSULES HAVING AN OUTER SHELL COMPRISING A SILOXANE AND METHODS FOR MAKING SAME

RELATED APPLICATIONS

This application claims the benefit of U.S. Provisional Application No. 62/464,733, filed Feb. 28, 2017, which is incorporated herein in its entirety.

TECHNICAL FIELD

The present disclosure relates to capsules having a polymer wall encapsulating a core composition including a phase change material (PCM) and an outer shell comprising a siloxane tethered to the polymer wall by a surfactant.

BACKGROUND

Articles made from cotton fabric and other natural material fabrics (such as linen, wool, etc.) are generally absorbent, and may feel comfortable under conditions of very light perspiration. However, under conditions of heavier perspiration, these fabrics feel wet, heavy and clingy, restricting movement and becoming uncomfortable to wear.

Wicking technology for apparel has been developed to address this problem. Generally, wicking aims to pull moisture away from the skin of the wearer and make the wearer more comfortable while being active. In the early to mid-nineties, patent applications were filed for moisture-managing clothing, where a fabric would pull moisture away from the skin via a dual-layered fabric, where the layer closest to the skin would be hydrophobic, and the outer layer would be hydrophilic. In some cases, these two components were woven into the same layer of clothing, in order to make the material thinner. The hydrophobic layer would wick moisture, so as to pull it away from the wearer, then force the moisture into contact with the hydrophilic layer, which would then absorb the moisture and spread it out along the surface of an article of clothing. The thinning of the moisture would allow evaporation from the clothing at a quicker rate than normal fabric. The hydrophobic layer would typically consist of a polyester or cotton fiber, whereas the hydrophilic layer would typically consist of a nylon or polypropylene fiber. One main issue with this is that the wicking and evaporating of the moisture is not noticeable to the wearer.

Accordingly, there is a need for better wicking and overall moisture control in clothing articles.

SUMMARY

In one aspect, capsules, such as microcapsules or macrocapsules, are disclosed that have a core composition comprising a phase changing material encapsulated in a polymer wall and having an outer shell formed of a siloxane chemically bonded to an exterior surface of the polymer wall by a surfactant. The surfactant is one or more of a cationic surfactant, an anionic surfactant, and a non-ionic surfactant, and the polymer wall comprises one or more of a melamine formaldehyde, a crosslinked melamine formaldehyde, a resorcinol urea formaldehyde, a poly-urea formaldehyde, an acrylic polymer, and a gelatin. The siloxane can form a crystalline outer shell or a sol-gel outer shell. When the capsules are microcapsules, the microcapsules may have a diameter of about 15 µm to about 25 µm. The capsules have an enthalpy of greater than 75 J/g as measured by differential scanning calorimetry.

In all embodiments, the PCM can be a $C_{10}$-$C_{40}$ hydrocarbyl and in some embodiments, the siloxane is $NaAlSi_2O_6$. The siloxane can form a crystalline outer shell or a sol-gel outer shell.

In one embodiment, the polymer wall is a crosslinked melamine formaldehyde and the cross-linked melamine comprises melamine formaldehyde polymerized with a crosslinking agent comprising:

(a) a reaction product of a cyclic urea (U) and a multifunctional aldehyde (A), and (b) at least one crosslinker selected from the group consisting of (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1), (b2) reaction products of urea and/or cyclic ureas and formaldehyde, (b3) alkoxycarbonylaminotriazines, (b4) multifunctional isocyanates which may be partially or completely blocked, (b5) reaction products of phenols and aliphatic monoaldehydes, (b6) multifunctional epoxides, (b7) multifunctional aziridines, (b8) multifunctional carbodiimides, wherein any of the crosslinkers (a) and (b) which have hydroxyl groups may be etherified with one or more linear, branched, or cyclic aliphatic alcohols. The crosslinked melamine formaldehyde capsules have a free formaldehyde level of less than 100 pm.

In another aspect, textile fabrics are disclosed that have a plurality of the capsules disclosed herein incorporated therein, which may be present as a layer on a surface of the textile fabric at a thickness of about 1 mm to about 50 mm. The textile fabric may be bedding or an article of clothing. The plurality of capsules has an enthalpy that is greater than 75 J/g as measured by differential scanning calorimetry.

In another aspect, methods for producing an outer shell of a capsule, such as a microcapsule or macrocapsule, are disclosed. The method includes the provision of pre-formed capsules that have a core composition comprising a phase changing material encapsulated by a polymer wall, treating pre-formed capsules with a surfactant solution to form a surfactant-coated capsule (the surfactant is tethered to the exterior surface of the capsule), and treating the surfactant-coated capsule with a compound containing a siloxane functional group. The surfactant connects the compound containing the siloxane functional group to the exterior surface of the polymer wall and the compound containing the siloxane functional group forms an outer shell of the capsule. The compound containing a siloxane functional group may be one or more of sodium silicate, tetramethyl orthosilicate, and tetraethyl orthosilicate. In one embodiment, the surfactant solution is in an organic solvent and the outer shell is a sol-gel reaction product.

The surfactant solution is an aqueous solution, and the method further comprises, subsequent to treating with the compound containing the siloxane functional group, treating the surfactant-coated capsules with a metal-oxygen containing compound to form a crystalline outer shell. The metal-oxygen containing compound comprises one or more of sodium, aluminum, calcium, potassium, iron, manganese, or magnesium as an acetate, phosphate, sulfate, ethoxide, silicate, hydroxide, oxide hydroxide, nitrate, thiocyanate, chlorate, and/or nitrite.

DETAILED DESCRIPTION

Figure 1:
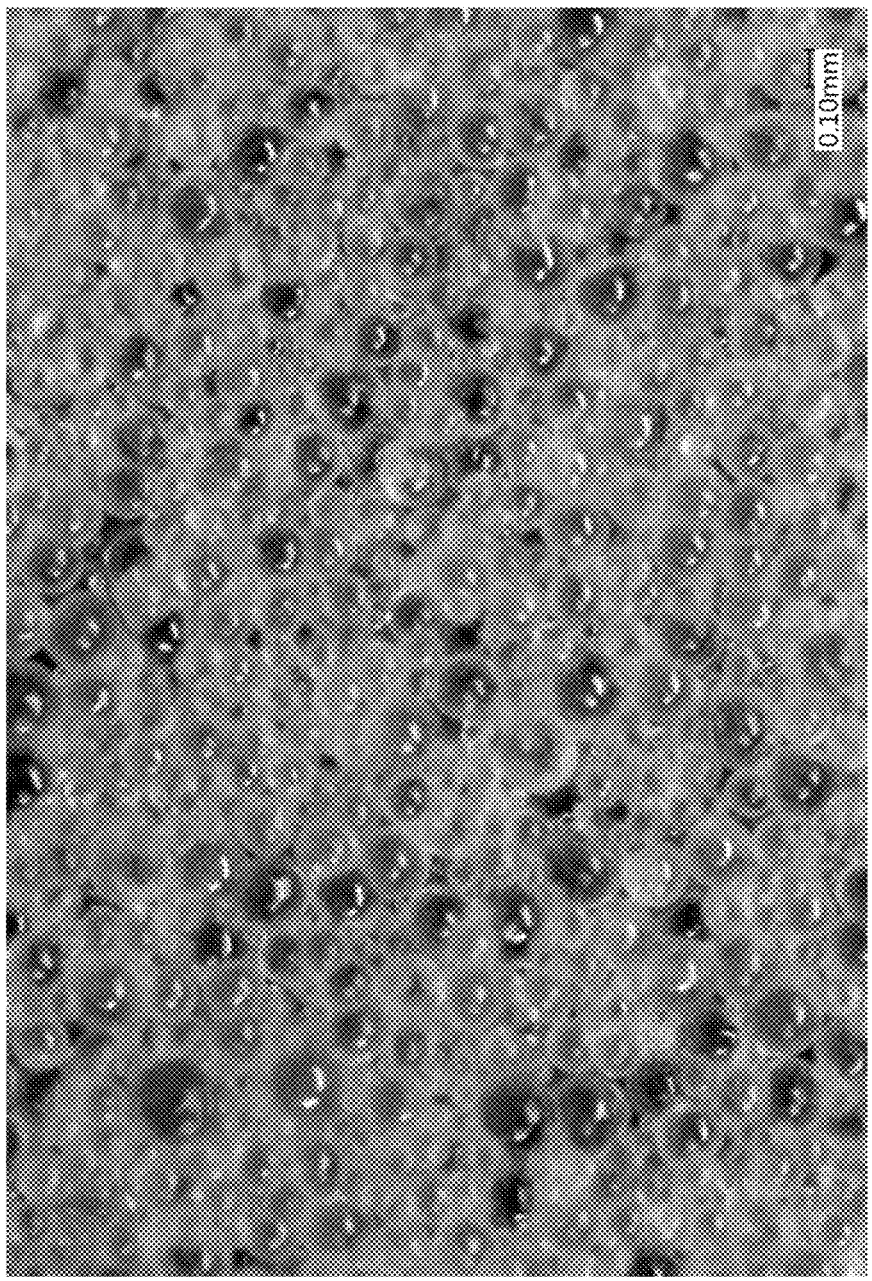
FIG. 1 is an SEM image, 0.10 mm scale, of capsules having a melamine-formaldehyde polymer wall encapsulating a phase change material before addition of a sodium aluminum silicate crystalline shell.

The following detailed description will illustrate the general principles of the invention, examples of which are additionally illustrated in the accompanying drawings. In the drawings, like reference numbers indicate identical or functionally similar elements.

Provided in this disclosure are capsules including a core encapsulated by a polymer wall, and an outer shell having a siloxane tethered to the exterior surface of the polymer wall, which renders the capsule capable of wicking moisture, such as water and/or sweat. The core of such capsules comprises a phase changing material, which enables the capsules to have a high heat of absorption. As such, the capsules are suitable for inclusion in a textile material or fabric to cool a wearer of an article of clothing made therefrom and to pull moisture away from the wearer's body. To attach the siloxane to the exterior of the pre-formed capsules, a surfactant acts as a tether to connect the crystalline silicate compound to the exterior surface of the polymer wall, typically through electrostatic interactions, i.e., a chemical bond. For example, a hydrophobic portion of a surfactant can interact with the polymer wall via hydrophobic association.

As used herein, the term "about" allows a degree of variability in a value or range, for example, within 10% of a stated value or of a stated limit of a range for all embodiments, but within 5% of a stated value or of a stated limit of a range in more preferred embodiments.

As used herein, the term "hydrocarbon" refers to a functional group or molecule that includes carbon and hydrogen atoms. The term can also refer to a functional group or molecule that normally includes both carbon and hydrogen atoms but wherein some or all the hydrogen atoms are substituted with other functional groups.

As used herein, the term "substituted" refers to an organic group as defined in which one or more hydrogen atoms contained therein are replaced by one or more substituents. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups.

Figure 2:
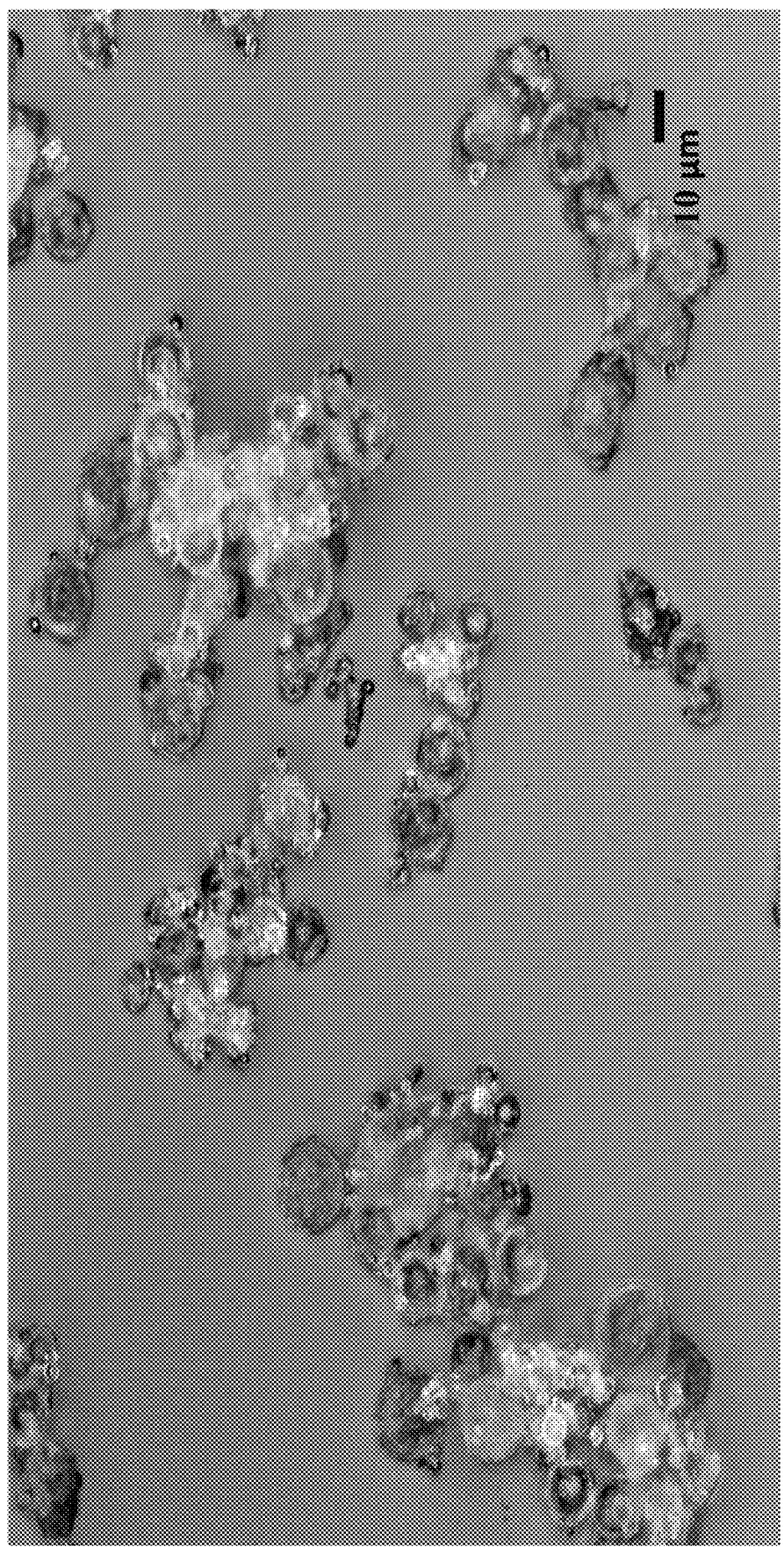
FIG. 2 is an SEM image, 10 μm scale, of the capsules of FIG. 1 after the addition of a sodium aluminum silicate ($NaAlSi_2O_6$) crystalline shell, which is tethered to the melamine-formaldehyde polymer wall.

Referring to FIGS. 1 and 2, SEM image of capsules are shown. FIG. 1 comprises capsules having a melamine-formaldehyde polymer wall encapsulating a phase change material before addition of a sodium aluminum silicate ($NaAlSi_2O_6$) crystalline shell. FIG. 2 comprises the same capsules after addition of the $NaAlSi_2O_6$ crystalline shell.

Figure 3:
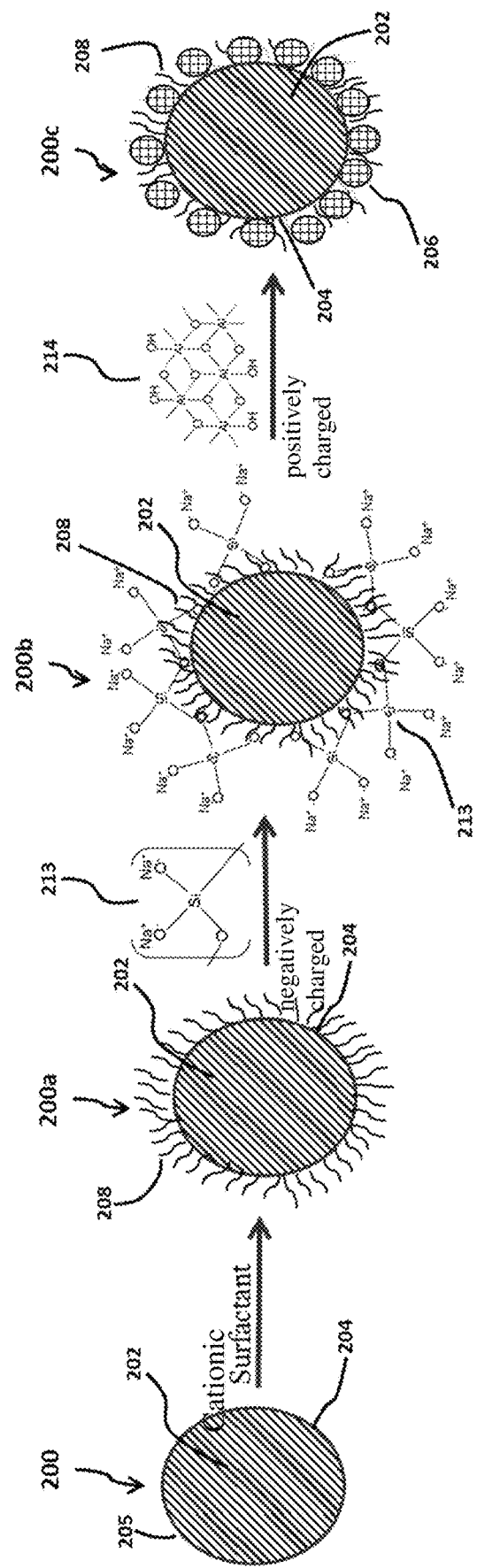
FIG. 3 is a flow diagram of addition of the $NaAlSi_2O_6$ shell to pre-formed capsules, represented as a cross-sectional view.

Referring to FIG. 3, capsule 200c has an outer $NaAlSi_2O_6$ shell 206 surrounding a polymer wall 204 encapsulating a PCM 202 as the core. The $NaAlSi_2O_6$ shell 206 is typically an outermost shell or coating, but in some embodiments another coating can be applied thereto. For example, an adhesive coating (e.g., a discontinuous adhesive coating) can be applied to allow the capsules to adhere to a surface. The capsule 200c having the $NaAlSi_2O_6$ shell 206 is formed from a preformed capsule 200 that has one or more PCMs 202 as the core encapsulated within the polymer wall 204. Polymer wall 204 is used as a scaffold on which a surfactant 208 is tethered, in FIG. 3 a cationic surfactant, and the surfactant 208 tethers the $NaAlSi_2O_6$ shell 206 to the exterior surface 205 of the polymer wall 204.

As shown in FIG. 3, capsule 200 is treated with a cationic surfactant to form surfactant-coated capsule 200a. The surfactant-coated capsule 200a is then treated with a sodium silicate 213 to form sodium silicate-coated capsule 200b. The silicate-coated capsule 200b is then treated with an aluminum complex 214 containing oxygen, specifically nano-boehmite in this example, to form a $NaAlSi_2O_6$ shell 206. The nano-boehmite is dissolved in water, such as deionized water, and the $NaAlSi_2O_6$ shell 206 formed may be a continuous (i.e., a full, endless coating) or a discontinuous (partial) shell. The polymer wall 204, PCM 202, and surfactant 208 can be any polymer wall, PCM, or cationic surfactant described herein.

Figure 4:
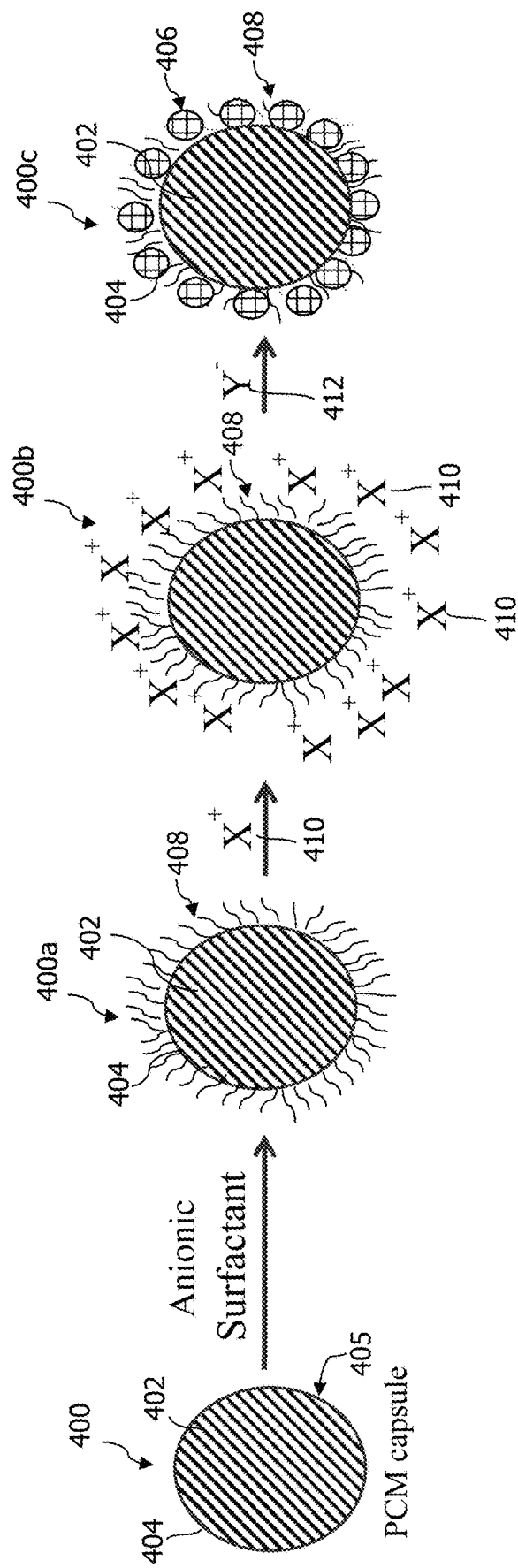
FIG. 4 is a flow diagram of an alternate embodiment of addition of a crystalline silicate compound as an outer shell, represented as a cross-sectional view, to pre-formed capsules.

Referring to FIG. 4, in another embodiment, the outer shell, here 406, may be formed on the exterior surface 405 of the polymer wall 404 of a pre-formed capsule 400 containing a core composition 402 by introducing an anionic surfactant 408 to form the surfactant-containing intermediate capsule 400a. The surfactant 408 is introduced as an aqueous solution. The pre-formed capsule 400 can be added to the surfactant solution (or vice versa) with stirring and heating (if desired) for sufficient time to allow the surfactant 408 to tether to the polymer wall 404 thereof. After the surfactant 408 is applied to the polymer wall 404, the surfactant-containing intermediate capsule 400a is treated with a metal-oxygen containing compound to form a secondary intermediate capsule 400b. For example, the metal-oxygen containing compound (such as boehmite) can be added to an aqueous solution of surfactant-containing intermediate capsule 400*a* and stirred for a sufficient time to allow the compound to chemically bond to the surfactant 408. The secondary intermediate capsule 400*b* is then treated with a compound containing a siloxane functional group 412 to form a crystalline, silicate outer shell 406. The compound containing a siloxane functional group 412 is dissolved in water, such as deionized water, and the crystalline outer shell 406 formed may be a continuous (i.e., a full, endless coating) or a discontinuous (partial) shell.

While FIGS. 3 and 4 are described as starting with pre-formed capsules, the methods herein may further include forming the capsules. The capsules can be formed by encapsulating a PCM in a polymer shell using known methods of encapsulations such as coacervation, polymer-polymer phase separation, interfacial and dispersion polymerization, in-situ polymerization, solvent phase separation, desolvation, solvent evaporation, spray drying, spray chilling, matrix encapsulation, various types of fluid bed, extrusion, and various hybrid systems. The PCM and polymer shell can be any PCM and polymer shell described herein.

As discussed above with respect to the example set forth in FIG. 3, the outer shell comprising the siloxane may form a crystalline outer shell; see resultant capsules 200*c* in FIG. 3 and the SEM image in FIG. 2. When the method of making the capsules includes aqueous solutions for the surfactant and the compound containing a siloxane functional group and a metal-oxygen containing compound is used to precipitate the siloxane as a silicate (or vice versa), the outer shell will be crystalline. In other embodiments, as demonstrated in working example 5, the outer shell comprising the siloxane may form a sol-gel product, which is not crystalline. Here, the solutions have organic solvents and, after the surfactant has been tethered to the exterior surface of the polymer wall, a silicate is added, and adequate time is provided for the silicate to be chemically bonded to the surfactant. Then, a strong base is added to catalyze the reaction of the silicate to form the outer shell.

Each PCM in the core can include a substituted or unsubstituted, saturated or unsaturated $C_{10}$-$C_{40}$ hydrocarbon, particularly a $C_{10}$-$C_{40}$ hydrocarbon having a melting point of about −30° C. to about 70° C., and mixtures thereof. In some embodiments, the PCM can be an ester, an alcohol, a carboxylic acid, a salt hydrate, an ether, or a mixture thereof. The PCM of the core can be selected for the purpose having a melting point that would be comfortable to the wearer. Some preferred embodiments include a $C_{15}$-$C_{25}$ hydrocarbon or mixtures thereof, since these hydrocarbons have melting points in a range that is comfortable to a wearer of an article of clothing having the capsules disclosed herein incorporated therein.

Examples of saturated or unsaturated $C_{10}$-$C_{40}$ hydrocarbons, which are branched or linear, include, but are not limited to, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, and n-octacosane. Examples of cyclic hydrocarbons include, but are not limited to, cyclohexane, cyclooctane, and cyclodecane. Examples of aromatic hydrocarbyl compounds include, but are not limited to, benzene, naphthalene, biphenyl, and o- or n-terphenyl. Examples of $C_{10}$-$C_{40}$-alkyl-substituted aromatic hydrocarbons include, but are not limited to, dodecylbenzene, tetradecylbenzene, hexadecylbenzene, hexylnaphthalene or decyinaphthalene. Examples of saturated or unsaturated $C_{10}$-$C_{30}$-fatty acids include, but are not limited to, lauric, stearic, oleic or behenic acid, and eutectic mixtures of decanoic acid with myristic, palmitic or lauric acid. Examples of fatty alcohols include, but are not limited to, lauryl, stearyl, oleyl, myristyl, cetyl alcohol, mixtures such as coconut fatty alcohol, and the so-called oxo alcohols which are obtained by hydroformylation of α-olefins and further reactions. Examples of $C_n$-alkyl esters include, but are not limited to, $C_1$-$C_{10}$-alkyl esters of fatty acids, such as propyl palmitate, methyl stearate or methyl palmitate, and their eutectic mixtures or methyl cinnamate. Examples of natural and synthetic waxes include, but are not limited to, montan acid waxes, montan ester waxes, polyethylene wax, oxidized waxes, polyvinyl ether wax, and ethylene vinyl acetate wax. In some embodiments, the PCM is a paraffin wax.

In all embodiments, the PCM can include one or more of docosane, docosene, eicosane, heneicosane, heptadecane, hexadecane, nonadecane, octadecane, tetracosane, and tricosane. In some embodiments, the core composition includes octadecane or is octadecane.

The core composition can have a melting point of about −30° C. to about 70° C. For textile materials suitable for articles of clothing a melting point in a range that is comfortable to the wearer is preferred. Accordingly, a core composition with a melting point of 15° C. to about 40° C. or more particularly about 25° C. to about 35° C. is useful. If the capsules are intended to be incorporated in a material or fabric to be used in cold environments, a PCM, or mixture of PCMs, with a lower melting point can be selected, for example about −20° C. to about 5° C. If the capsules are intended to be incorporated in a fabric to be used in hot environments, a PCM, or mixture of PCMs, with a higher melting point can be selected, for example about 25° C. to about 45° C.

In all embodiments, the capsules typically have a relatively high payload of a core composition relative to the amount of material forming the polymer wall and the outer shell. The core in the capsules can be about 10% to about 90% by weight of the capsule. In some embodiments, the PCM is about 70% to about 80% by weight, more particularly about 75% to about 85%, and even more particularly about 77% to about 81% by weight of the capsule. In some embodiments, the PCM is at least 50% by weight of capsule, more particularly at least 70%, and even more particularly at least 80% by weight of the capsule.

The polymer wall can include a melamine formaldehyde, a crosslinked melamine formaldehyde, a resorcinol urea formaldehyde, a poly-urea formaldehyde, an acrylic polymer, a gelatin, or a mixture thereof, or another known wall material made using known methods such as in-situ polymerization, interfacial polycondensation, interfacial crosslinking, or any other known method. In some embodiments, the polymer wall includes crosslinked melamine formaldehyde.

The polymer wall and capsule can have low levels of formaldehyde. For example, melamine formaldehyde walled microcapsules can have levels of free formaldehyde around 200 ppm, however, a crosslinked melamine formaldehyde walled microcapsule (as discussed in detail below) can have free formaldehyde levels of less than about 100 pm, less than about 50 ppm, less than about 20 ppm, or less than about 10 ppm.

The in-situ polymerization process of polycondensation can prepare capsules having a melamine formaldehyde polymer wall and a PCM core. The process can include a melamine formaldehyde prepolymer, soluble in a continuous water phase, and a hydrophobic PCM, as dispersed core droplets. As the polymerization reaction starts in the aqueous solution, the formed oligomers start to collapse on the surface of the core droplets. On the surface, polymerization continues, and crosslinking occurs that results in the formation of a solid melamine formaldehyde wall.

Capsules having a gelatin wall encapsulating a core material are known, as taught in Onder et al. *Encapsulation of Phase Change Materials by Complex Coacervation to Improve Thermal Performances of Woven Fabrics*, Thermochimica Acta. 2008, 467, 63-72, and in Patrick et al. *Optimization Process by Complex Coacervation of Fish Oil Using Gelatin/SDS/NaCMC and Secondary Coating Application with Sodium Polyphosphate*, IJSBAR. 2014, 17, 74-94.

For a crosslinked melamine microcapsule, reference is made to U.S. Provisional Application No. 62/206,367 for methods of making the microcapsule, which is incorporated herein by reference. These microcapsules are made from a melamine formaldehyde prepolymer comprising a crosslinking agent, the crosslinking agent being a mixture of:

(a) a reaction product of a cyclic urea (U) and a multifunctional aldehyde (A), and (b) at least one crosslinker selected from the group consisting of (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1), (b2) reaction products of urea and/or cyclic ureas and formaldehyde, (b3) alkoxycarbonylaminotriazines, (b4) multifunctional isocyanates which may be partially or completely blocked, (b5) reaction products of phenols and aliphatic monoaldehydes, (b6) multifunctional epoxides, (b7) multifunctional aziridines, (b8) multifunctional carbodiimides, wherein any of the crosslinkers (a) and (b) which have hydroxyl groups may be etherified with one or more linear, branched, or cyclic aliphatic alcohols, polymerized by adjusting the pH and/or addition of urea. The crosslinking agent (b) is preferably at least one crosslinker selected from the group consisting of (b1), (b2), (b3), and (b5). These cross-linked melamine microcapsules have MF prepolymer present in a ratio by weight percent to the crosslinking agent of 1:1 to 4:1, more preferably 1.5:1 to 3.75:1. These capsules have an initial free formaldehyde level of less than 100 ppm, more preferably less than 80 ppm, less than 60 ppm, and even more preferably less than 40 ppm. Such a crosslinking agent is available from Allnex USA Inc.

In one embodiment, the crosslinking agent has the reaction product of a cyclic urea U and a multifunctional aliphatic aldehyde A, portion (a), in a mixture with one or more of (b1), (b2), (b3) and (b5). Mixtures of the reaction product of a cyclic urea (U) and a multifunctional aldehyde (A) and one or more of the crosslinkers (b) have a ratio of the mass of the reaction product to the mass of the crosslinker (b) (or to the sum of the masses of all crosslinkers (b)) from 1/99 to 99/1, preferably from 10/90 to 90/10, and more preferably from 30/70 to 70/30.

The multifunctional aldehyde A has the formula OHC—R'—CHO where R' may be a direct bond or a divalent radical which may preferably be a linear, branched or cyclic aliphatic radical and may have from one to twenty carbon atoms, both these options for R' leading to a divalent aldehyde having exactly two —CHO groups, or an aliphatic divalent radical which may be linear, branched or cyclic and may have from one to twenty carbon atoms, which radical carries at least one additional aldehyde group —CHO, which latter option leads to trivalent or polyvalent aldehydes having at least three aldehyde groups. Preferred aldehydes are divalent aliphatic aldehydes, particularly glyoxal, malonic dialdehyde, succinic dialdehyde, and glutaric dialdehyde. Especially preferred is glyoxal in an aqueous solution, as anhydrous solid which has to be cooled as its melting temperature is 15° C., or in the form of its dimer or trimer, optionally in solid hydrated form as dihydrates, or in the form of its addition products with sulphites or hydrogen sulphites which decompose under acidic conditions.

The cyclic ureas U which may be used according to the present invention have at least one unsubstituted amidic —NH group. These cyclic ureas are cycloaliphatic or bicycloaliphatic compounds having an element of the structure —NH—CO—NH— within a ring structure, the total number of ring atoms preferably being from 5 to 7 (ethylene urea, 1,2-propylene urea, 1,3-propylene urea, 1,4-butylene urea or tetramethylene urea). Particularly preferred is ethylene urea or a mixture comprising ethylene urea, especially a mixture comprising at least a mass fraction of 50% of ethylene urea. In the case of a bicyclic compound, the simplest structure is glycoluril or acetylene diurea. Hydroxy functional ureas are not useful for the present invention. The cyclic ureas may be substituted, preferably by alkyl groups on the N- or C-atoms, or both, the alkyl residues preferably having from one to four carbon atoms. At least one of the nitrogen atoms must remain unsubstituted to enable reaction with the aldehyde functional molecule. Preferably, at least one cyclic urea is selected from the group consisting of ethylene urea, 1,2-propylene urea, hydantoin also known as glycolyl urea, and parabanic acid also known as oxalyl urea, and glycoluril. A particularly preferred combination is glyoxal reacted with ethylene urea, and optionally, either glyoxal, or ethylene urea, or both, in mixture with other multifunctional aldehydes and/or other cyclic ureas. In a preferred case of using ethylene urea as the cyclic urea, and glyoxal as the multifunctional aldehyde, —R'— is a direct bond, and —X— is —NH—CH$_2$—CH. Additional details are found in the co-pending application referenced above.

A melamine formaldehyde resin that is particularly suitable for the above cross-linked melamine capsules is CYMEL® 385 melamine formaldehyde resin available from Allnex USA Inc. The melamine formaldehyde resin may be one that includes phenol, such as a resorcinol urea formaldehyde resin.

One example method of making microcapsules that have an acrylic polymer wall is disclosed in co-pending U.S. application Ser. No. 14/561,473, which is incorporated herein by reference.

The surfactant used to tether the outer shell to the polymer wall can be a cationic surfactant, an anionic surfactant, or a non-ionic surfactant.

The cationic surfactant can include, for example, amine salts, such as, ethoxylated tallow amine, cocoalkylamine, and oleylamine, quaternary ammonium compounds such as cetyl trimethyl ammonium bromide, myristyl trimethyl ammonium bromide, stearyl dimethyl benzyl ammonium chloride, lauryl/myristryl trimethyl ammonium methosulfate, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, cocoyl hydroxyethylimidazolinium, or a mixture thereof. In some embodiments, the cationic surfactant is cetyl trimethyl ammonium bromide.

Suitable anionic surfactant include, but are not limited to, water-soluble salts of alkyl sulfates, alkyl ether sulfates, alkyl isothionates, alkyl carboxylates, alkyl sulfosuccinates, alkyl succinamates, alkyl sulfate salts such as sodium dodecyl sulfate, alkyl sarcosinates, alkyl derivatives of protein hydrolyzates, acyl aspartates, alkyl or alkyl ether or alkylaryl ether phosphate esters, sodium dodecyl sulphate, phospholipids or lecithin, or soaps, sodium, potassium or ammonium stearate, oleate or palmitate, alkylarylsulfonic acid salts such as sodium dodecylbenzenesulfonate (SDBS), sodium dialkylsulfosuccinates, dioctyl sulfosuccinate, sodium dilaurylsulfosuccinate, poly(styrene sulfonates) and salts thereof, isobutylene-maleic anhydride copolymer, gum arabic, sodium alginate, carboxymethylcellulose, cellulose sulfate and pectin, isobutylene-maleic anhydride copolymer, carrageenan; semi-synthetic polymers such as sulfated methylcellulose, carboxymethyl starch, phosphated starch, lignin sulfonic acid; and synthetic polymers such as maleic anhydride copolymers (including hydrolyzates thereof), polyacrylic acid, polymethacrylic acid, acrylic acid butyl acrylate copolymer or crotonic acid homopolymers and copolymers, vinylbenzenesulfonic acid or 2-acrylamido-2-methylpropanesulfonic acid homopolymers and copolymers, and partial amide or partial ester of such polymers and copolymers, carboxymodified polyvinyl alcohol, sulfonic acid-modified polyvinyl alcohol and phosphoric acid-modified polyvinyl alcohol, phosphated or sulfated tristyrylphenol ethoxylates.

Suitable non-ionic surfactants include, but are not limited to, alkyl polysaccharides, alcohol ethoxylates, block copolymers, castor oil ethoxylates, ceto/oleyl alcohol ethoxylates, cetearyl alcohol ethoxylates, decyl alcohol ethoxylates, dinonyl phenol ethoxylates, dodecyl phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, mono-branched alcohol ethoxylates, nonyl phenol ethoxylates, octyl phenol ethoxylates, oleyl amine ethoxylates, various copolymer alkoxylates, sorbitan ester ethoxylates, stearic acid ethoxylates, stearyl amine ethoxylates, tallow oil fatty acid ethoxylates, tallow amine ethoxylates, tridecanol ethoxylates, acetylenic diols, polyoxyethylene sorbitols, and mixtures thereof.

Examples of suitable nonionic surfactants include, but are not limited to, ethylene maleic anhydride (EMA), styrene maleic anhydride (SMA), sulfonated polystyrene, citric acid, methyl gluceth-10, PEG-20 methyl glucose distearate, PEG-20 methyl glucose sesquistearate, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty alcohols, including 3 to 20 ethylene oxide moieties, polyoxyethylene-20 isohexadecyl ether, polyoxyethylene-23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 400 dioleate or 600 dioleate, poloxamers such as poloxamer 188, polysorbate 21, 40, 60, 61, 65, 80, 81, or 85, sorbitan caprylate, sorbitan cocoate, sorbitan diisostearate, sorbitan dioleate, sorbitan distearate, sorbitan fatty acid ester, sorbitan isostearate, sorbitan laurate, sorbitan oleate, sorbitan palmitate, sorbitan sesquiisostearate, sorbitan sesquioleate, sorbitan sesquistearate, sorbitan stearate, sorbitan triisostearate, sorbitan trioleate, sorbitan tristearate, sorbitan undecylenate, or mixtures thereof. In some embodiments, the surfactant can include sorbitan stearate (e.g., SPAN® 60), sorbitan monooleate (e.g., SPAN® 80), polyethylene glycol sorbitan monooleate (TWEEN® 80), polyvinyl alcohol, ethylene oxide/propylene oxide block copolymers (e.g., PLUIRONIC® P105), polyoxyethylene (5) nonylphenylether, branched (IGEPAL® CO-520), or a mixture thereof.

The outer shell includes a siloxane, which is chemically bonded to the exterior surface of the polymer wall of the capsules by the surfactant. A compound containing a siloxane functional group is used in all the embodiments disclosed herein. Such compounds include, but are not limited to, sodium silicate, tetramethyl orthosilicate, tetraethyl orthosilicate, diethoxydimethylsilane, and combinations thereof.

When the method of making the outer shell is performed using aqueous solutions, the outer shell is formed by reacting a compound containing a siloxane functional group and a metal-oxygen containing compound, either of which may be tethered to the surfactant first. The reaction forms a precipitate of a silicate, which is crystalline, as the outer shell. The metal-oxygen containing compound comprises one or more of a sodium, aluminum, calcium, potassium, iron, manganese, or magnesium as an acetate, phosphate, sulfate, ethoxide, silicate, hydroxide, oxide hydroxide, nitrate, thiocyanate, chlorate, and/or nitrite. In the example set forth in FIG. 3, the metal-oxygen containing compound is nano-boehmite, an aluminum oxide hydroxide and the compound containing a siloxane functional group is sodium silicate.

When the method of making the outer shell is performed in an organic solvent, the outer shell is formed by reacting a compound containing a siloxane functional group and a strong base. The reactant product is typically a sol-gel. The strong base may be ammonium hydroxide or sodium hydroxide. The organic solvent is preferably a nonpolar, short-chained solvent. Examples include, but are not limited to, cyclohexane, toluene, benzene, and mixtures thereof Regardless of the method of making the outer shell, the capsules having an outer shell comprising a siloxane have improved properties of wicking and cooling moisture. The capsules can be tailored to have a desired amount of the outer shell present. In one embodiment, the outer shell is about 1% to about 10% by weight of each capsule, or more preferably about 3% to about 8% by weight of each capsule. With the amount of outer shell being tailorable, the size of the capsules will vary relative thereto and relative to the size of the preformed capsules used as a starting material. As noted above, the resultant capsules can be microcapsules or macrocapsules. For microcapsules, the average mean size (typically a diameter) is about 1 μm to about 1,000 μm. In one embodiment, the average mean size is about 50 μm to about 100 μm, more preferably about 10 μm to about 40 μm, and even more preferably about 15 μm to about 25 μm. The resultant capsules are typically, generally spherical, but variation therein is more likely with the presence of the outer shell.

The capsules with the outer shell present have an enthalpy value as a result of the presence of the core composition and the thickness of the outer shell. Preferably the enthalpy values are greater than about 75 J/g, greater than about 100 J/g, or greater than about 120 J/g, as measured by differential scanning calorimetry (DSC). In some embodiments, the capsules have an enthalpy of about 75 J/g to about 200 J/g, about 100 to about 175 J/g, or about 110 J/g to about 150 J/g.

The capsules having the outer shell disclosed herein may be formulated into a composition having a delivery vehicle, such as a binder for adhering the capsules to a textile material or a textile fabric. The composition may be an aqueous composition. When the capsules are incorporated into the textile material or textile fabric the benefit of wicking moisture away from the wearer while providing a cooling effect is achieved. The capsules can line the inside of an article of clothing or a surface of athletic equipment exposed to the wearer, such as the inside padding of a bicycle helmet or a yoga mat or cooling towel. The capsules, typically in the size of microcapsules, form a layer on a surface of the textile material or textile fabric at an applied thickness of about 1 mm to about 50 mm, preferably about 10 mm to about 30, and more preferably about 15 mm to about 25 mm. In other embodiments, the capsules may be imbedded in the textile material or textile fabric.

The textile material or fabric can include more than one type of capsule. For example, capsules having PCMs with differing melting points may be selected to provide a mixture of capsules reacting at different temperatures. In one embodiment, a textile material or fabric can include capsules having a PCM with a melting point of about 15° C. to about 25° C., capsules having a PCM with a melting point of about 25° C. to about 35° C., and capsules having a PCM with a melting point of about 35° C. to about 45° C. Such a textile material or fabric could allow for continuous cooling as a wearer's body temperature increases during an activity. The fabric may be, but is not limited to, cotton, acetate, acrylic, chiffon, corduroy, denim, georgette, hemp, jute, linen, mohair, polyester, silk, rayon, velvet, wool, or blends thereof.

Figure 7:
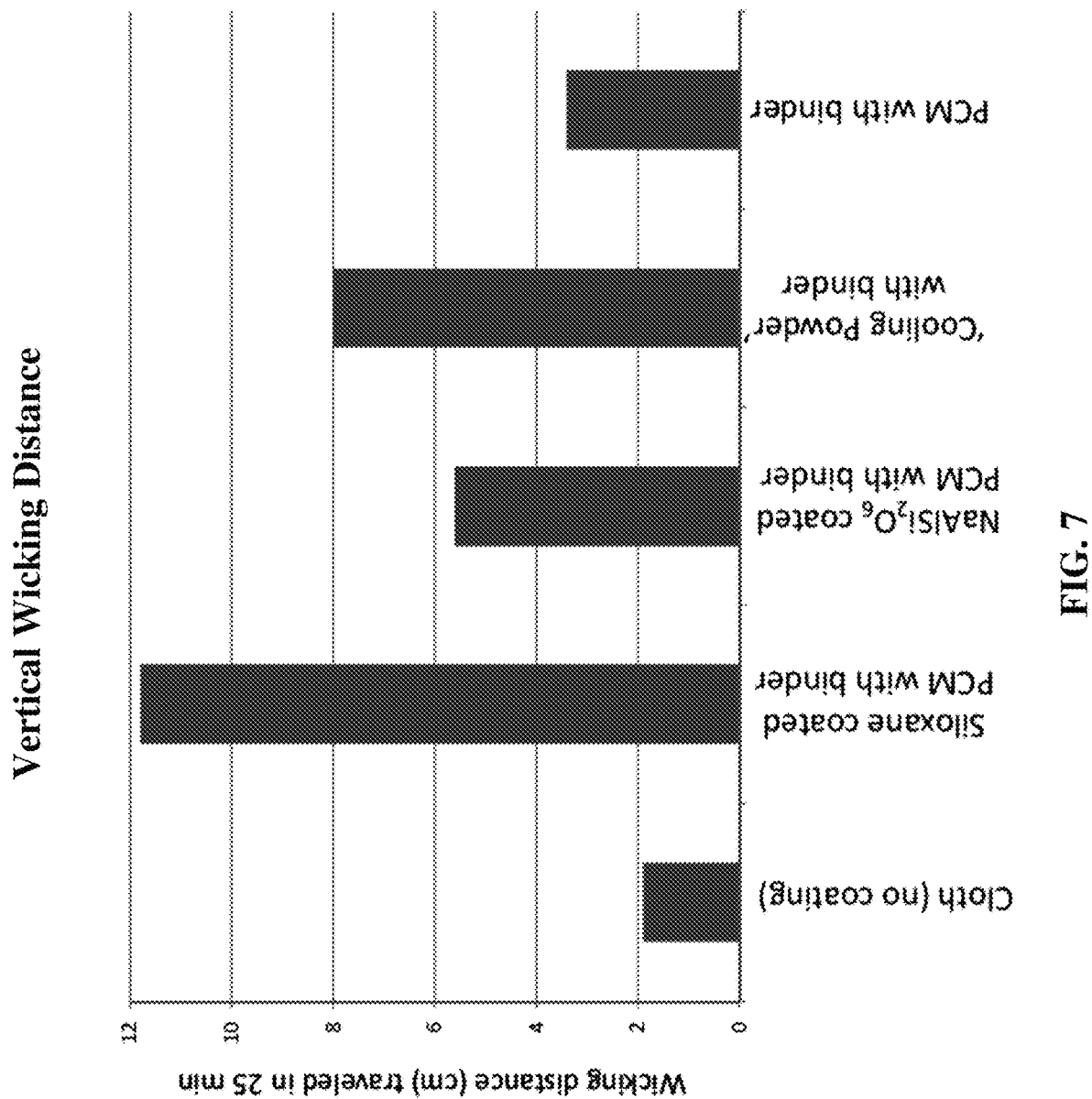
FIG. 7 is a bar graph comparing the vertical wicking distance of a cloth comprising inventive examples compared to existing wicking "cooling powder."
Figure 8:
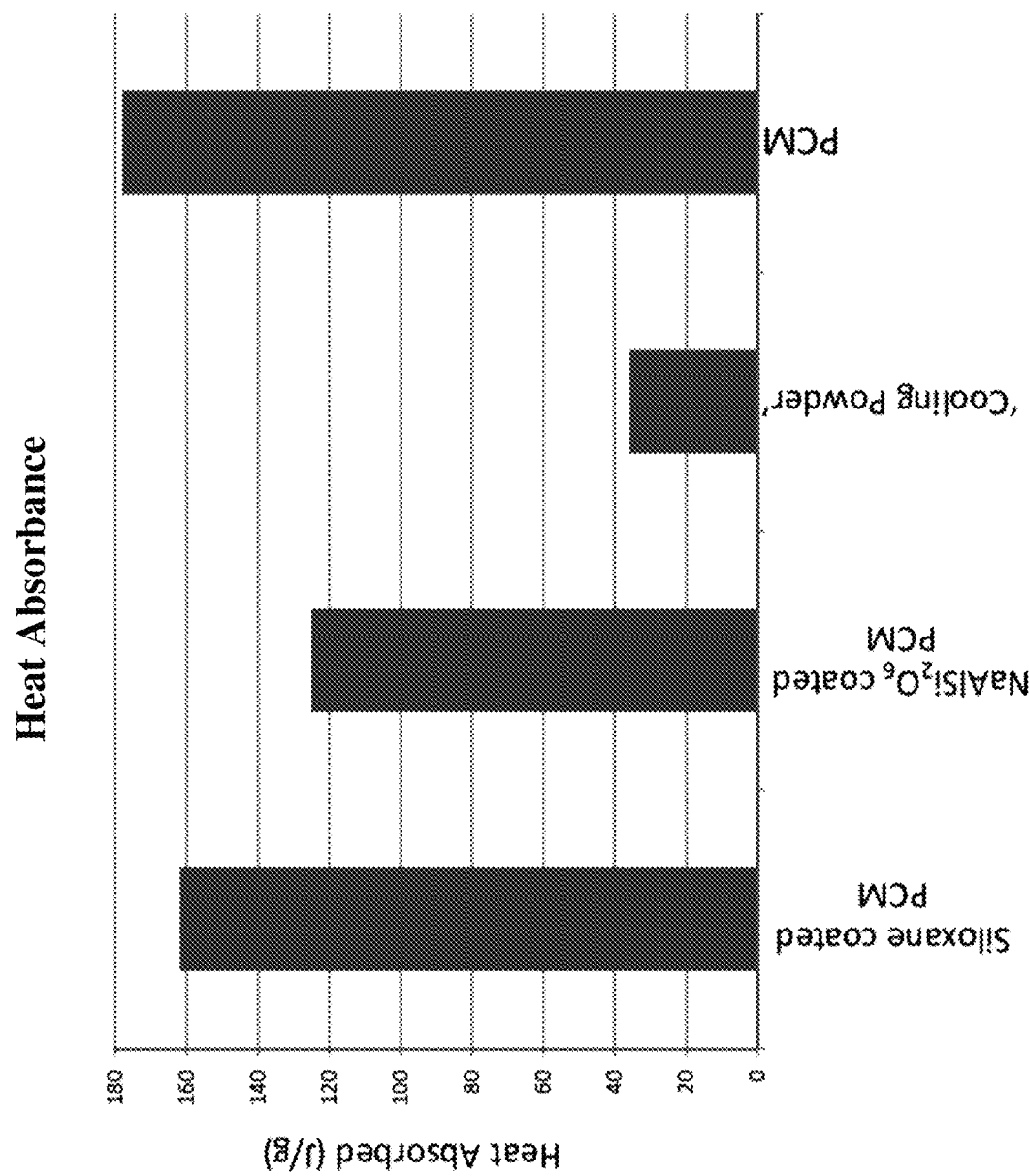
FIG. 8 is a bar graph comparing the heat absorbance (J/g) of inventive examples compared to existing wicking "cooling powder."

Referring to FIGS. 7 and 8, comparative analysis of vertical wicking and heat absorbance was conducted for a cloth with no coating as a first control, the same cloth with the preformed microcapsules without an outer shell as a second control, the same cloth material with a cooling powder currently available (the prior art), the same cloth material with microcapsules having a siloxane outer shell formed using the organic solvent method disclosed herein, and the same cloth material with microcapsules having a $NaAlSi_2O_6$ outer shell formed using the aqueous method disclosed herein. The vertical wicking, the number of centimeters traveled in 25 minutes, was determined as described in Example 1. As seen in FIG. 7, a 5 inch by 1 inch cloth sample with no coating had a vertical wicking distance of 1.9 cm after 25 minutes. A cloth with PCM capsules and binder (i.e., the pre-formed capsules) had a vertical wicking distance of 3.4 cm. A cloth with PCM capsules having a $NaAlSi_2O_6$ shell had a vertical wicking distance of 5.6 cm, nearly double that of the pre-formed PCM capsules, and nearly triple that of the cloth with no coating. The "cooling powder" currently used in athletic gear had a vertical wicking distance of 8.0 cm. Lastly, the siloxane coated PCM capsules had a vertical wicking distance of almost 12 cm. While the "cooling powder" cloth had slightly higher vertical wicking than the $NaAlSi_2O_6$ coated PCM capsules, the enthalpy of the samples must also be taken into consideration as shown in FIG. 8.

Enthalpy controls the actual cooling effect that the wearer feels with increased physical activity, so the better product is a fabric with a good balance of vertical wicking distance and an adequate enthalpy. The enthalpy of each sample was measured by differential scanning calorimetry using a PerkinElmer DSC 4000. As seen in FIG. 8, the "cooling powder currently in use only had an enthalpy of 35.8 J/g. With the high wicking ability, the wearer will feel drier, however, with its low enthalpy, the wearer will not feel cooler during physical activity.

The microencapsulated PCM with no additional coating had an enthalpy of 178 J/g, which is almost 5 times higher than the cooling powder cloth. Accordingly, the PCM would make the wearer feel cooler over a period of high physical activity. The $NaAlSi_2O_6$ outer shell provided the capsules with an enthalpy of about 125 J/g, which is 3.5 times higher than the cooling powder cloth and high enough to be felt by the wearer. The siloxane out shell provided the capsules with an enthalpy of about 160 J/g, which is even better than the capsules with the $NaAlSi_2O_6$ outer shell. When taking FIGS. 7 and 8 in combination, the microencapsulated PCM with no additional coating has the highest enthalpy but the lowest wicking, the 'cooling powder' has the lowest enthalpy with the highest wicking, and the PCM microcapsules with the $NaAlSi_2O_6$ outer shell and siloxane outer shells have both, a relatively high enthalpy and high wicking, which is by far the best combination of these properties.

Example 1

Preformed microcapsules having a core composition including octadecane, were provided. To tether the secondary reagent to the exterior surface of the polymer wall of the microcapsules, 3.0 grams (g) of cetyl trimethylammonium bromide (CTAB) (a surfactant) was dissolved in 400 g of deionized water and heated to 40° C. Then, 40 g of the pre-formed microcapsules were added to this solution with mixing until the surfactant was bound to the capsule's polymer wall.

Separately, 55 g of sodium silicate (27% solution in water) was diluted in 100 g of deionized water. Sodium silicate has negatively charged oxygen within its structure that is or becomes available to associate with the surfactant tethered to the polymer wall of the preformed microcapsules. This sodium silicate solution was added drop-wise to the solution containing the microcapsules with mixing until the sodium silicate was associated with (chemically connected to) the surfactant tethered to the microcapsules.

Thereafter, 15 g of aluminum hydroxide oxide was added to 250 g of deionized water. This solution was then added to the silicate-containing intermediate microcapsule solution and allowed to react at 45° C. for 12 hours. The aluminum is drawn to the charged surface of the silicates and forms a sodium aluminum silicate shell on the PCM microcapsules. These resultant capsules were then cooled to ambient temperature, washed several times in deionized water and vacuum filtered.

Figure 5A:
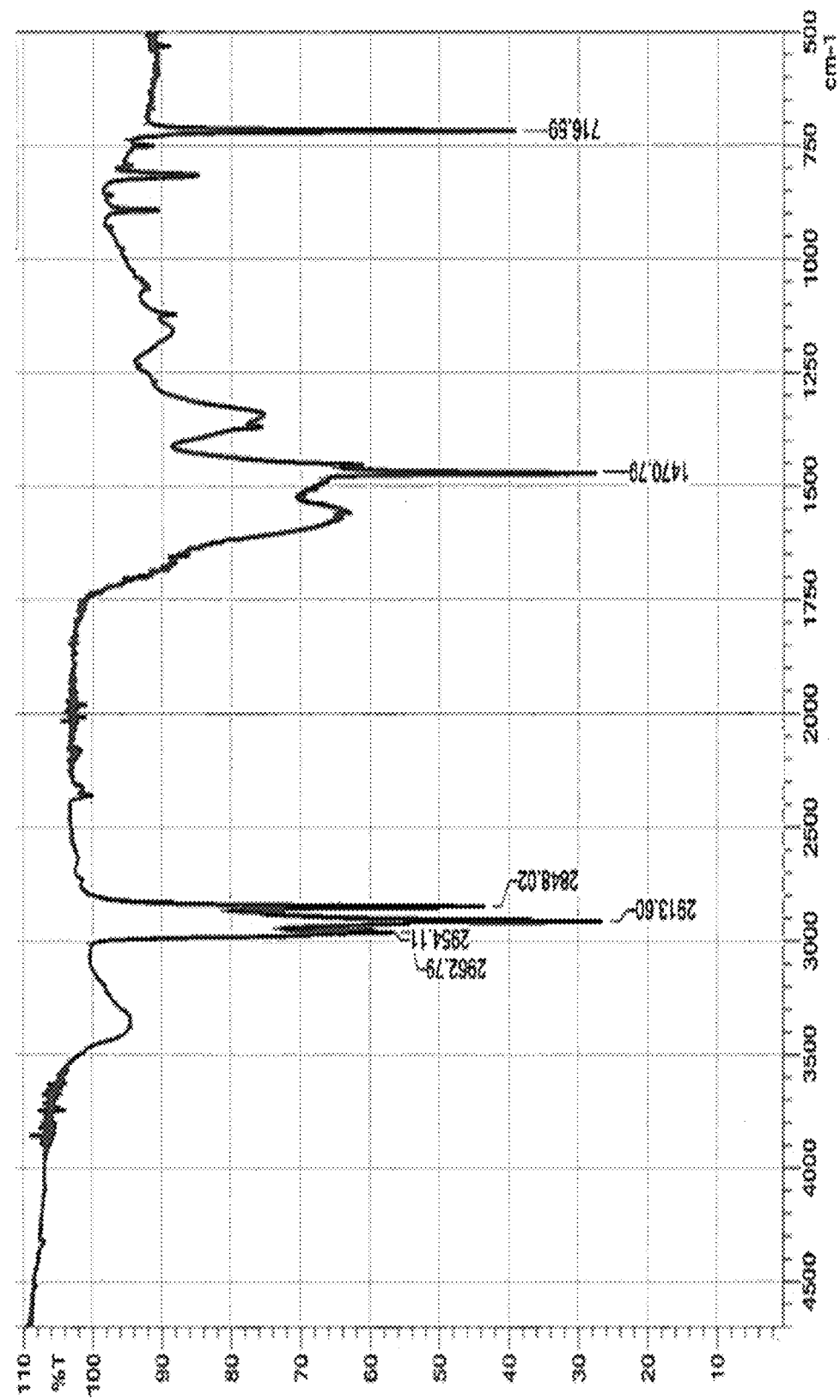
FIG. 5A is a FTIR spectra of the pre-formed PCM microcapsules (no tethered outer shell).
Figure 5B:
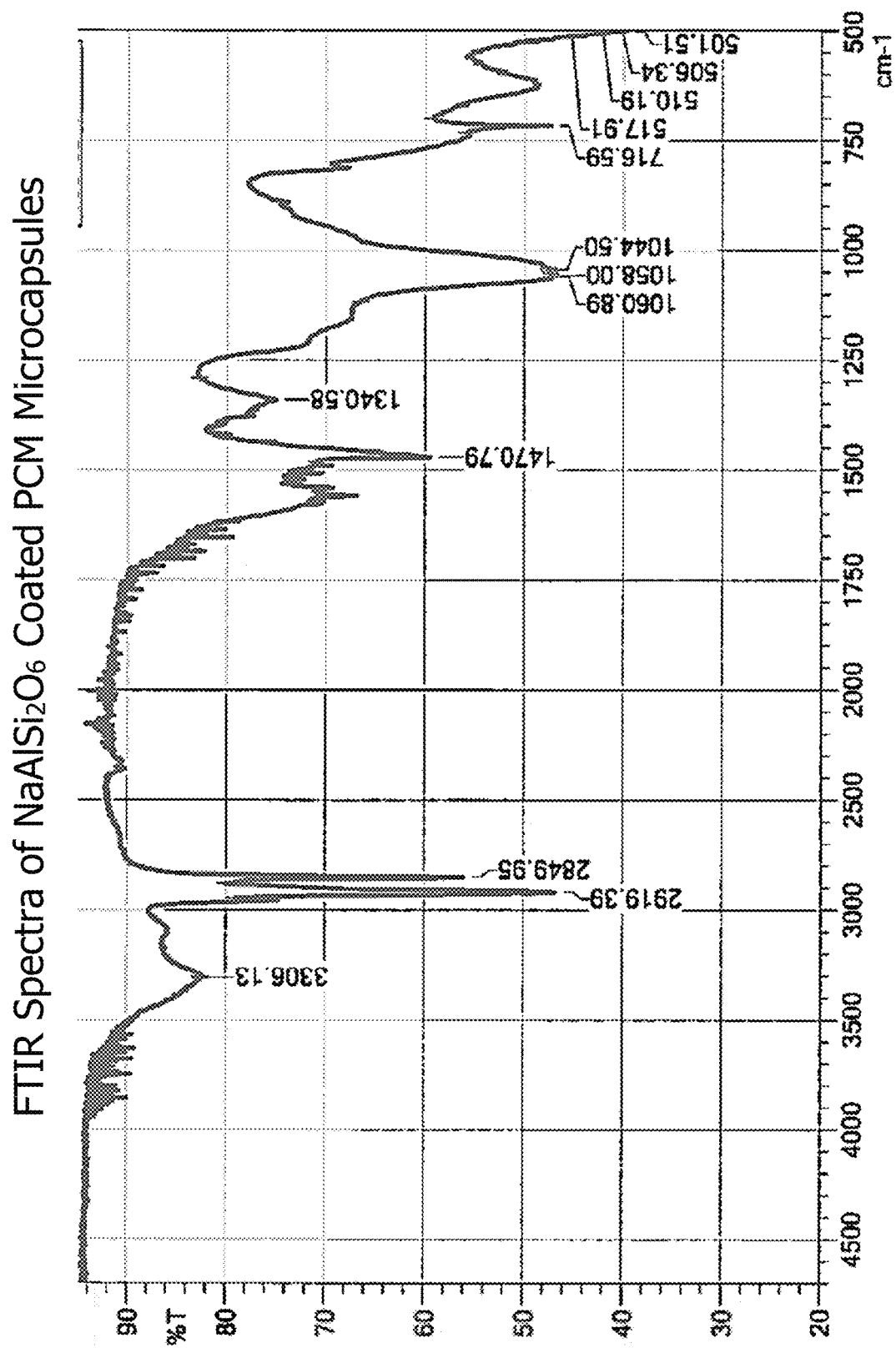
FIG. 5B is a FTIR spectra of $NaAlSi_2O_6$ coated PCM microcapsules.
Figure 6:
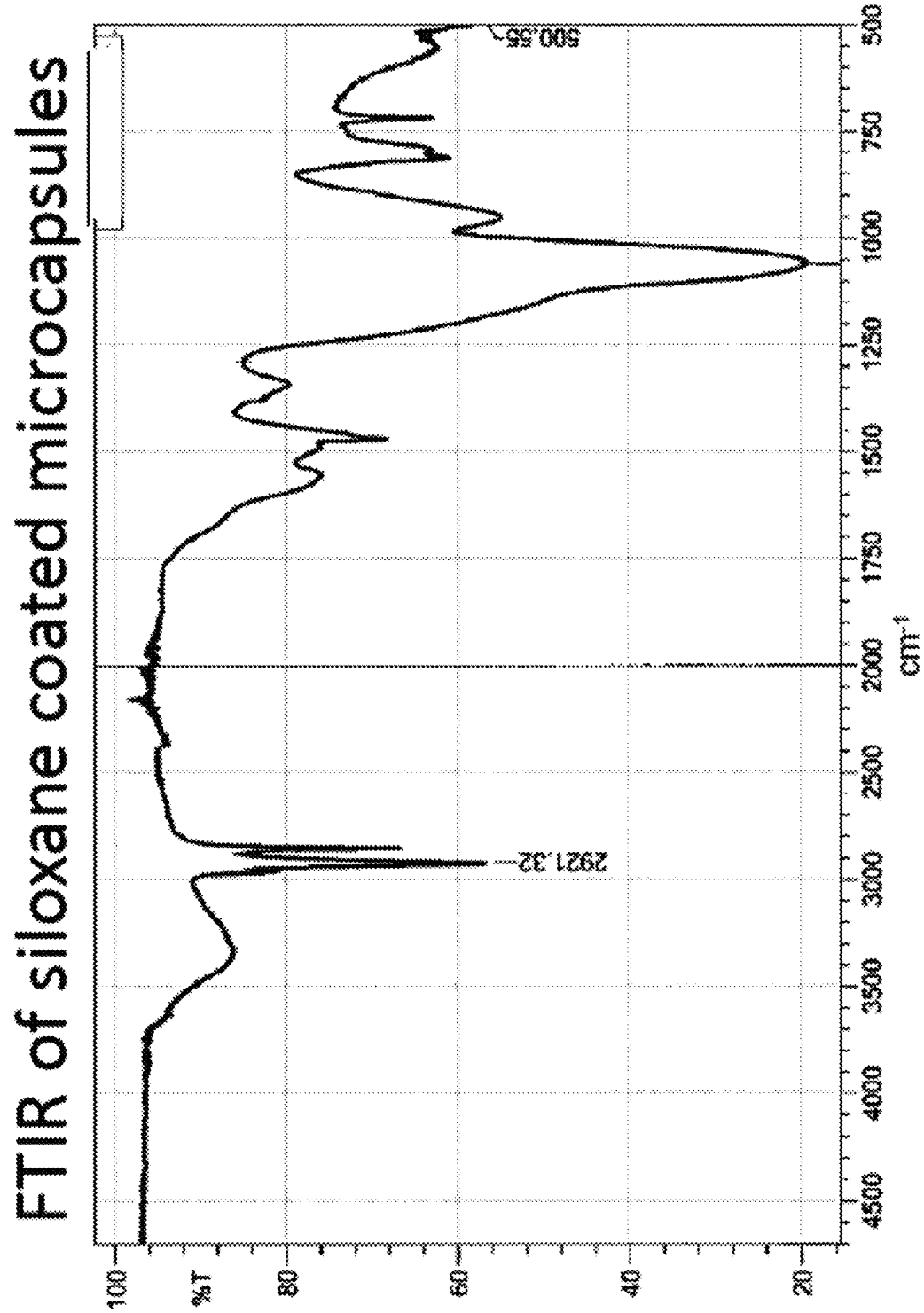
FIG. 6 is an FTIR spectra of siloxane coated microcapsules.

FTIR was employed to analyze the pre-formed PCM microcapsules (FIG. 5A) and the pre-formed PCM microcapsules after formation of a $NaAlSi_2O_6$ shell thereon (FIG. 5B). Notably, between FIG. 5A and FIG. 5B, FIG. 5B has a large Si—O—Si stretch occurring around 1050 cm$^{-1}$, which confirms the presence of the Si—O—Si functional group in the $NaAlSi_2O_6$ coated PCM microcapsules.

Next the wicking ability of the resultant capsules was measured. Vertical wicking was measured by first cutting a 5 inch by 1 inch piece of cotton cloth, then applying a 20 mm thick layer of a mixture of the resultant capsules, binder, and water, where the total solids content of this mixture was 25% and contained 10% cooling capsules. A second 5 inch by 1 inch piece of cotton cloth was cut and coated with a 20 mm thick layer of a mixture of a cooling powder (prior art— crushed jadeite mineral (NaAlSi$_2$O$_6$) in powder form), a binder, and water. The coated pieces of cloth were then allowed to dry in a 150° C. oven for about 10 minutes or until completely dry.

These coated and dried pieces of cloth were then suspended in a solution of water with food coloring for 25 minutes in order to see the water's distance traveled up the cloth. For this, 75 mL of water with 2 drops of red food coloring was added to a 250 ml Erlenmeyer flask. Each piece of cloth was allowed to touch the bottom of the flask, but the cloths were not dipped in more than this. After 25 minutes of vertical wicking, the cloths were then taken out of the water, and the distance traveled was measured. The results of the test are set forth in FIG. 7, which was discussed in detail above.

Example 2

The procedure of Example 1 was repeated, but the CTAB was replaced in turn with each of the following surfactants for a plurality of trials: SPAN® 60 nonionic surfactant, SPAN® 80 nonionic surfactant, TWEEN® 80 nonionic surfactant, sodium dodecylbenzenesulfonate (SDBS), polyvinyl alcohol (PVA), and PLUIRONIC® P105 surfactant and combinations thereof which may include CTAB. Microcapsules having an inorganic wall of sodium aluminum silicate resulted from each trial.

Example 3

The preformed microcapsules may be made as a first part of any of the methods disclosed herein. Several examples are provided below demonstrating different polymer walls of the preformed microcapsules. Melamine formaldehyde walled microcapsules have moderately high levels of around 50-60 ppm free formaldehyde; however, a crosslinked melamine formaldehyde walled microcapsule, as described herein, has been known to possess free formaldehyde levels at 20 ppm or below, often reaching 10 ppm or below.

176.72 g of a surfactant such as ethylene maleic anhydride/diethylamine (EMA/DEA) (containing 2.5% EMA, 1.1% DEA, and 96.4% water) was mixed with 200 g of water and heated to 44° C. with stirring using an overhead mixer equipped with a turbine. Then, 268 g of octadecane, the core material, was added to the aqueous mixture of surfactant. Upon addition of the core material, the stir speed was increased to about 300 rpm, and soon thereafter, a coacervate formed. After stir emulsifying for about an hour, wall materials were added.

The wall was a melamine formaldehyde (MF), in particular a CYMEL® 385 resin. About 59 g of CYMEL® 385 resin was added to the core and surfactant coacervate, where 75% of the wall material was added 60 minutes after stir emulsifying, and the remaining wall material was added 70 minutes after stir emulsifying and homogenizing. After the first amount of wall material is added, the coacervate solution is homogenized until 15 µm to 25 µm diameter microcapsules were formed using a homogenizer, for example one made by IKA Works, Inc. of Wilmington, N.C. Subsequently, 25 minutes after the first CYMEL® 385 resin addition, 88 g of potassium dihydrogen phosphate (KH$_2$PO$_4$) was added over 10 minutes. After the addition of the KH$_2$PO$_4$ solution, the temperature of the solution was slowly raised to 65° C. Once the temperature was at 65° C., 16.44 g of urea was added, and the now formed microcapsules were allowed to cure at this temperature. After curing for 4 hours, the microcapsules were cooled to ambient temperature, the pH adjusted to 7 followed by vacuum filtering to recover the microcapsules. These microcapsules are now ready for surface treatment according to the procedure of any of Examples 1-2.

Example 4

In one exemplary synthesis of a resorcinol urea formaldehyde (RUF) microcapsule, 160 g of a surfactant such as polyvinyl alcohol (PVA) (containing 50% PVA-540 solution and 50% PVA-125 solution, where both contain 5% solids and 95% water) was mixed with 150 g water and heated to 45° C. with stirring using an overhead mixer equipped with a mixer turbine. Then, 148 g of a core material chosen from eicosane, hexadecane, docosane, docosene, and octadecene, previously heated to 50° C., was added to the aqueous mixture of surfactant. Upon addition of the core material, the stir speed was increased to about 300 rpm, and soon thereafter, a coacervate formed. After stir emulsifying for about an hour, capsules having a diameter of about 15 µm to 25 µm were obtained using a homogenizer, such as one made by IKA Works, Inc. of Wilmington, N.C. After the pre-selected diameter was reached, the wall materials were added sequentially.

The wall material additions were: 6 g of urea, 11 g of resorcinol, 35 g of formaldehyde, and 80 g of water. The additions were made to the core and surfactant coacervate, where 33.3% of the wall material was added 60 minutes after stir emulsifying, 33.3% was added 60 minutes after the first wall addition, and the remaining wall material was added 120 minutes after the first wall addition. All wall materials were added to the coacervate drop wise. Furthermore, after the first wall addition, the pH of the emulsion was adjusted to be within the range of 1.5 to 2. After the last wall material was added, the temperature of the solution was raised to 50° C. and cured at this temperature for eight hours. After curing, the microcapsules were cooled to ambient temperature, the pH adjusted to 6 followed by vacuum filtering to recover the microcapsules. These microcapsules are now ready for surface treatment according to the procedure of any of Examples 1-2.

Examples 3 and 4 were repeated with different hydrocarbons as the core materials, specifically, eicosane, hexadecane, docosane, docosene, and octadecene, which were then treated according to the procedure of Example 1 to add a sodium aluminum silicate wall tethered to the polymer wall of the microcapsules by a surfactant.

Example 5

Preformed microcapsules having a core composition including octadecane, were provided. To tether a siloxane wall to the exterior surface of the polymer wall of the microcapsules, 0.5 g of SPAN® 60 nonionic surfactant and 0.5 g of sodium dodecylbenzene sulfonate surfactant were dissolved in 300 g of cyclohexane and heated to 30° C. and stirred for 20 minutes. Then, microcapsules were added to the surfactant solution and stirred vigorously for one hour at 30° C. After the surfactant was allowed enough time to bond to the exterior surface of the polymer capsule wall, 15 g of tetraethyl orthosilicate (TEOS) was added dropwise and stirred for one hour at 30° C. Then, 10 g of deionized water was added to this in order to allow the siloxane coating to become thinner and more uniform. The resultant solution was stirred for 5 minutes to allow for uniform distribution. After an hour of stirring, 30 g of 28% ammonium hydroxide solution was added dropwise as a catalyst to hydrolyze siloxane formation, stirred for 30 minutes, then the resulting solution was allowed to sit, covered, for 48 hours to allow the siloxane spheres to form. After uniform siloxane shells formed around each of the microcapsules, the solution was filtered and washed several times with hexanes.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A capsule comprising:
   a core composition comprising a phase change material (PCM);
   a polymer wall encapsulating the core composition;
   a surfactant having a hydrophobic portion in hydrophobic association with the exterior surface of the polymer wall; and
   an outer shell comprising a reaction product of a silicate and a metal-oxygen containing compound or a reaction product of a metal-oxygen containing compound and a compound containing a siloxane functional group chemically bonded to an exterior surface of the polymer wall by the surfactant.

2. The capsule of claim 1, wherein the surfactant comprises one or more of a cationic surfactant, an anionic surfactant, and a non-ionic surfactant.

3. The capsule of claim 1, wherein the PCM comprises a $C_{10}$-$C_{40}$ hydrocarbyl.

4. The capsule of claim 1, wherein the metal-oxygen containing compound comprises $NaAlSi_2O_6$.

5. The capsule of claim 1, wherein the reaction product forms a crystalline outer shell and the outer shell is a discontinuous shell.

6. The capsule claim 1, wherein the capsule is a microcapsule or a macrocapsule.

7. The capsule of claim 1, wherein the capsule is a microcapsule having a diameter of about 15 μm to about 25 μm.

8. The capsule of claim 1, wherein the polymer wall comprises one or more of a melamine formaldehyde, a crosslinked melamine formaldehyde, a resorcinol urea formaldehyde, a poly-urea formaldehyde, an acrylic polymer, and a gelatin.

9. The capsule of claim 8, wherein the polymer wall comprises a crosslinked melamine formaldehyde and the cross-linked melamine comprises melamine formaldehyde polymerized with a crosslinking agent comprising:
   (a) a reaction product of a cyclic urea (U) and a multifunctional aldehyde (A), and
   (b) at least one crosslinker selected from the group consisting of
      (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1),
      (b2) reaction products of urea and/or cyclic ureas and formaldehyde,
      (b3) alkoxycarbonylaminotriazines,
      (b4) multifunctional isocyanates which may be partially or completely blocked,
      (b5) reaction products of phenols and aliphatic monoaldehydes,
      (b6) multifunctional epoxides,
      (b7) multifunctional aziridines,
      (b8) multifunctional carbodiimides,
   wherein any of the crosslinkers (a) and (b) which have hydroxyl groups may be etherified with one or more linear, branched, or cyclic aliphatic alcohols.

10. The capsule of claim 9, wherein the capsule has a free formaldehyde level of less than 100 pm.

11. The capsule of claim 1, wherein the capsule has an enthalpy of greater than 75 J/g as measured by differential scanning calorimetry.

12. A textile fabric comprising a plurality of capsules according to claim 1.

13. The textile fabric of claim 12, wherein the textile fabric is an article of clothing.

14. The textile fabric of claim 12, wherein each capsule of the plurality of capsules has an enthalpy of greater than 75 J/g as measured by differential scanning calorimetry.

15. The textile fabric of claim 12, wherein the plurality of capsules forms a layer having a thickness of about 1 mm to about 50 mm on a surface of the textile fabric.

16. A method for producing an outer shell of a capsule comprising:
   providing a pre-formed capsule comprising:
      a core composition comprising a phase change material (PCM); and
      a polymer wall encapsulating the core composition;
   treating the pre-formed capsule with a surfactant solution to form a surfactant-coated capsule, wherein a hydrophobic portion of the surfactant is tethered to the exterior surface of the capsule;
   treating the surfactant-coated capsule with either a silicate ionic compound or a metal-oxygen containing compound to for a secondary intermediate; and
   treating the secondary intermediate with a metal-oxygen containing compound when a silicate ionic compound was used in treating the surfactant-coated capsule or with a compound containing a siloxane function group when a metal-oxygen containing compound was used in treating the surfactant-coated capsule to form a reaction product between the silicate ionic compound and the metal-oxygen containing compound or between the metal-oxygen containing compound and the compound containing a siloxane functional group;
   wherein the surfactant connects the reaction product to the exterior surface of the polymer wall and forms a crystalline outer shell of the capsule.

17. The method of claim 16, wherein the silicate ionic compound comprises one or more of sodium silicate, tetramethyl orthosilicate, and tetraethyl orthosilicate.

18. The method of claim 16, wherein the surfactant solution is an aqueous solution.

19. The method of claim 16, wherein the metal-oxygen containing compound comprises one or more of sodium, aluminum, calcium, potassium, iron, manganese, or magnesium as an acetate, phosphate, sulfate, ethoxide, silicate, hydroxide, oxide hydroxide, nitrate, thiocyanate, chlorate, and/or nitrite.

20. A capsule comprising:
   a core composition comprising a phase change material (PCM);
   a polymer wall encapsulating the core composition; and
   an outer shell comprising a siloxane chemically bonded to an exterior surface of the polymer wall by a surfactant;

wherein the polymer wall comprises a crosslinked melamine formaldehyde and the cross-linked melamine comprises melamine formaldehyde polymerized with a crosslinking agent comprising:
(a) a reaction product of a cyclic urea (U) and a multifunctional aldehyde (A), and
(b) at least one crosslinker selected from the group consisting of
   (b1) reaction products of an aminotriazine and at least one aldehyde selected from the group consisting of aliphatic monoaldehydes and multifunctional aliphatic aldehydes having the structure $Y(CHO)_n$, where Y is an n-functional aliphatic residue, and n is greater than 1, where U is not dihydroxyethylene urea if the crosslinker (b) is (b1),
   (b2) reaction products of urea and/or cyclic ureas and formaldehyde,
   (b3) alkoxycarbonylaminotriazines,
   (b4) multifunctional isocyanates which may be partially or completely blocked,
   (b5) reaction products of phenols and aliphatic monoaldehydes,
   (b6) multifunctional epoxides,
   (b7) multifunctional aziridines,
   (b8) multifunctional carbodiimides,
wherein any of the crosslinkers (a) and (b) which have hydroxyl groups may be etherified with one or more linear, branched, or cyclic aliphatic alcohols.

* * * * *